United States Patent Office 3,178,285
Patented Apr. 13, 1965

3,178,285
PHOTOGRAPHIC LAYERS FOR THE SILVER DYESTUFF BLEACHING PROCESS
Walter Anderau, Muenchenstein, Eugen Johann Koller, Binningen, and Rudolf Mory, Dornach, Switzerland, assignors to Ciba Limited, Basel, Switzerland, a company of Switzerland
No Drawing. Filed Mar. 8, 1961, Ser. No. 94,139
Claims priority, application Switzerland, Mar. 24, 1960, 3,316/60
6 Claims. (Cl. 96—73)

The production of a colored photographic image by the silver dyestuff bleaching method is based on the discovery that one of the wide range of azo-dyestuffs with which the layer-forming substance, more especially gelatine, can be colored, is bleached out depending on the quantity of image-forming silver present, when treated with a suitable, so-called silver bleaching bath. There occurs a reduction process controlled by the silver of the photographic image, whereby azo linkages are destroyed.

A process is also known in which a water-insoluble dyestuff pigment belonging to the series of indigoid or anthraquinoid vat dyestuffs is converted by the photographic image silver present, for example, with the aid of an alkaline stannite bath, into a water-soluble alkali salt of the leuco-compound, and then the latter is more or less well washed out. This process does not appear to have attained any practical importance, whereas the silver dyestuff bleaching process with azo-dyestuffs is being successfully used.

The present invention is based on the unexpected observation that phthalocyanine dyestuffs can be bleached out by the silver dyestuff bleaching process, also in this case depending on the silver present in the photographic image. This observation is particularly surprising in view of the fact that the reduction of phthalocyanine dyestuffs yields so-called leuco-compounds which are not more readily soluble than the unreduced phthalocyanine dyestuffs, so that they cannot be washed out of the image layer.

In applying the silver dyestuff bleaching process to phthalocyanine dyestuffs there is observed at the beginning of the bleaching process the early formation of an intermediate stage, which can be regarded as a leuco stage, and is of a redder shade than the initial dyestuff. This is followed by destruction of the dyestuff, the color density diminishes in the presence of the image silver, and the quantity of silver is diminished. This bleaching process yields blue to greenish blue to green images of excellent gradation.

The phthalocyanines correspond to the general formula

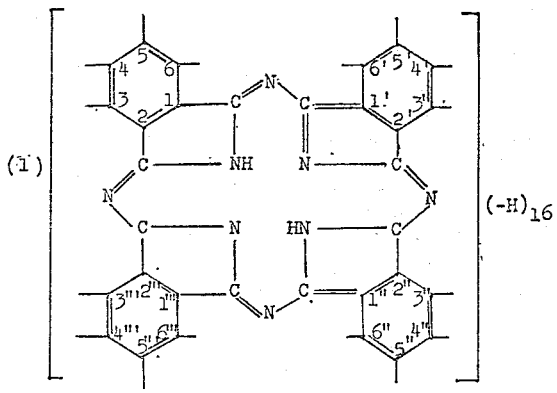

(1)

in which the benzene nuclei may be substituted. The unsubstituted phthalocyanine of the Formula 1 is a water-insoluble pigment which is of greenish blue color when finely dispersed.

The phthalocyanines form with heavy metals, such as manganese, cobalt, nickel and more especially copper, stable complex compounds, and these complex metal compounds, more especially the copper compounds, are of greater importance than the metal-free dyestuffs. The copper complex not containing further substituents can be represented by the formula

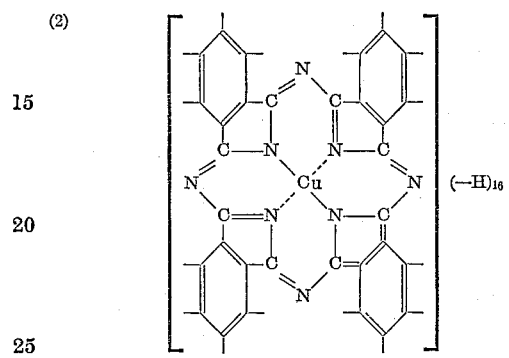

(2)

Numerous derivatives of phthalocyanine dyestuffs are known. Depending on the nature of the substituents these products may be soluble in water or in organic solvents, such as alcohols, acetone, hydrocarbons or pyridine compounds. Their tints generally ranges from blue to greenish blue to green, and are generally very pure and of considerable fastness to light. As is known, these products are suitable for dyeing a wide variety of consumer goods, such as textiles, natural and synthetic materials, and for making printing inks and paints, to mention only a few of their possible applications.

According to the present invention the phthalocyanines are used in the manufacture of colored photographic layers, more especially gelatine layers, or layers of other colloids used in the photographic industry, and more especially as dyestuffs for blue to blue-green images of original or copying material for color photography, thus in negative color materials, and in color diapositives for viewing by transmitted or incident light.

Thus, according to the present invention, the layer former is colored with a phthalocyanine and then mixed with a silver halide emulsion, the silver halide is sensitized for the desired spectral region, and the layer is then used, for example, as a component of a two-color or three-color system. Alternatively, an uncolored silver halide layer may be colored after exposure and development, for example, with a water-soluble phthalocyanine, and then subjected to the silver dyestuff bleaching process. The blue component image obtained by the silver dyestuff bleaching process can also be used for a transfer process or for an imbibition process.

The dyestuff bleaching bath used may be almost any of the known neutral or acid, more especially strongly acid, bleaching baths that contain a solvent for silver, such as thiourea, urea or a semicarbazide, in addition to an alkali metal halide, such as sodium or potassium chloride, bromide or iodide, or an ammonium halide. Furthermore, the catalysts, such as anthraquinone and its sulfonic acids or dimethylquinoxazoline and aminohydroxyphenazines, that are usually added to dyestuff bleaching baths used for bleaching azodyestuffs, generally likewise accelerate the dye bleach process.

It has also been observed that the bleaching process often proceeds more rapidly in the absence of strong light and that, when the dye bleaching is carried out in complete darkness, there are obtained the purest whites or the most colorless areas, where this is required due to the density of the image silver.

It has been found that layers rich in silver yield blue images of outstandingly flat gradation. The image silver not utilized in the dyestuff bleaching process is converted into silver halide in known manner by an oxidizing bath in the presence of an alkali metal halide, for example, by means of potassium ferricyanide and potassium bromide, or by an acid bath which contains copper sulfate and sodium chloride. Finally the material is fixed in a sodium thiosulfate bath, washed and dried.

The bleaching process can be further assisted by interposing intermediate rinsing operations, for example, bleaching for 10 minutes, rinsing for 5 minutes in water, again bleaching for 10 minutes, rinsing for 5 minutes, and then completing the bleaching. The addition of a water-soluble organic solvent, such as an alcohol, acetone, dioxane or a glycol, or dextrose, also assists the dyestuff bleaching process.

Many phthalocyanine dyestuffs, which are insoluble or soluble in water and/or in organic solvents, are known, and processes for making them are therefore known.

Phthalocyanine pigments can be incorporated in the gelatine in a microdispersed form, but it is more advantageous to use phthalocyanine derivatives that are soluble in water or in an organic solvent and can therefore be easily washed out of the gelatine, such as alcohol, acetone or dioxane. By sulfonating phthalocyanines, more especially copper phthalocyanines, with oleum or with chlorosulfonic acid followed by hydrolysis, there are obtained water-soluble products containing 1, 2, 3 or 4 sulfonic acid groups. By using sulfonated phthalic acid derivatives for making phthalocyanines there can be obtained phthalocyanine tetrasulfonic acids which contain the sulfonic acid groups in well defined positions. For the purposes of the invention there are suitable, for example, the following copper phthalocyanines containing sulfonic acid groups:

The 3:3'-disulfonic acid,
The 3:3':3"-trisulfonic acid,
The 3:3':3":3'''-tetrasulfonic acid,
The 3':4':4":4'''-tetrasulfonic acid, and
The 4:4':4":4'''-tetrasulfonic acid.

Phthalocyanine-carboxylic acids, and phthalocyanines containing both carboxylic acid groups and sulfonic acid groups, can be obtained. The readily water-soluble alkali metal salts of phthalocyanine sulfonic acids tend during the production of color component images partially to bleed into the baths used and to migrate into adjacent layers. It is then of advantage to use, instead of the alkali metal salts, non-diffusing salts of colorless basic substances, more especially guanidine salts of phthalocyanine sulfonic acid.

Water-soluble phthalocyanines can also be obtained by reacting phthalocyanine sulfonyl chloride with ammonia or a primary or secondary amine to form sulfonamides or sulfonamide-sulfonic acids of phthalocyanines.

By suitably choosing the number of sulfonic acid groups and of the sulfonamide groups, and more especially by suitably selecting the amines forming the amide groups, water-soluble phthalocyanines can be obtained that are completely fast to diffusion. By using for reaction with the phthalocyanine sulfonyl chlorides amines that are free from groups imparting solubility in water, and contain, for example, methoxy groups or ether groups derived from higher hydroxy-compounds, or hydrogenated radicals, there can be obtained phthalocyanines that are soluble in alcohol, acetone, dioxane and in ethanolamines.

As examples of such radicals, of which three or four are advantageously present in the phthalocyanine molecule, there may be mentioned sulfonic acid butylamide, butanolamide, hexylamide and ethanolamide radicals, and also the sulfonic acid para-hydroxyphenyl-meta-carboxylic acid radical (the salicylamide radical).

In particular, the following phthalocyanines suitable for use in the present process may be mentioned, in which "CuPh" in each case denotes the skeleton of the Formula 2:

$$CuPh-3:3':3'':3'''-[-SO_2-NH-(CH_2)_3-O-CH_3]_4$$

which is soluble in ethanol, acetone, dioxane and pyridine; pure greenish blue; its alcoholic solution gives a clear solution in gelatine, whereupon the alcohol can be washed out; completely fast to diffusion.

Water-soluble non-diffusing copper phthalocyanines:

$$CuPh-3:3':3''-[-SO_2-NHR]_3$$

and $$CuPh-3:3':3'':3'''-[-SO_2-NHR]_4$$

where R represents hydrogen, $-CH_3$, $-C_2H_5$ or $$-CH_2-CH_2-CH_2-OH$$

The absorption maxima of the phthalocyanines mentioned so far are within the wavelength range of 610 to 640 m$\mu$, while in the range from 400 to 550 m$\mu$ they are very transparent, which is particularly desirable. To displace the absorption into the range of longer wavelengths the hydrogen atoms in positions 3, 4, 5 or 6 of the compound of the Formula 1 or 2 may be substituted by residues R. When R represents a halogen atom, dyes of a more greenish appearance are obtained. They are obtained by the halogenation, for example, bromination, of the parent substance, or by the synthesis of phthalocyanines from halogen-phthalic acids or derivatives thereof. Instead of the halogens, there may be present as substituents nitro, amino-arylamino or acylamine groups, which also cause a change towards green.

Such dyestuffs are known, and, as examples, there may be mentioned the following phthalocyanines free from metal bound in complex union and their copper complexes.

5:5':5":5'''-tetrabromophthalocyanine-4:4':4":4'''-tetrasulfonic acid, and
3:3':3":3'''-tetrachlorophthalocyanine-4:4':4":4'''-tetrasulfonic acid.

A very strong visible shift towards green is produced when the phthalocyanines are further substituted by phenyl radicals. Such tetraphenyl-phthalocyanines can be prepared by methods known per se from 1:1'-diphenyl-3:4-dinitrile.

By introducing carboxylic acid groups and/or sulfonic acid groups pure greenish blue water-soluble phthalocyanines are obtained. If desired, as described above, these dyes can be rendered fast to diffusion by introducing diffusion-inhibiting groups, and in this manner dyestuffs are obtained that are particularly suitable for the silver dyestuff bleaching process.

Instead of introducing a metalliferous phthalocyanine into a photographic material, a metal-free phthalocyanine may be introduced and subsequently converted into a metal complex in the material containing the color image. Such a conversion takes place to a great extent or completely when a known strongly acid copper sulfate silver bleaching bath is used to remove the image silver. Complexes of other heavy metals however, tend to split up in a strongly acid medium, so that when the layer contains such a complex, or such a complex is to be formed in the layer, it is of advantage not to use a strongly acid bath, and to use a silver bleaching bath not containing copper, as otherwise there would be a risk of the final product being a mixture of the cobalt and copper complexes and/or the metal-free dyestuff, instead, for example, of the desired unitary cobalt complex.

The following examples illustrate the invention, the parts and percentages being by weight.

*Example 1*

The positive blue component of a multi-color original is copied on a cellulose acetate film carrying a lightsensitive silver bromide gelatine emulsion containing 15 mg. of silver per square decimeter. The black-and-white silver image is then developed and fixed in the conventional manner. The component image is fixed on the conventional manner. The component image is then immersed in an aqueous solution containing, per liter, 25 to 30 grams of the sodium 3:3'-disulfonate of copper phthalocyanine. The film is moved about and dyed for 10 to 30 minutes at 16 to 18° C. until the blue coloration of the gelatine has reached the desired density, for example, 1 to 1.5 logarithmic units. The film is then gently rinsed in water and, if desired, the gelatin layer is hardened in a hardening bath containing in 1000 parts of water 50 parts of an aqueous formaldehyde solution of 40% strength.

The color is bleached out in a solution maintained at 16 to 20° C., which contains in 1000 parts of water 60 to 100 parts of potassium bromide, 40 to 75 parts of thiourea, 35 to 80 parts of hydrochloric acid of 30% strength and, if desired, a catalyst, for example, 0.5 to 1 part of anthraquinone-2-sulfonic acid or 0.001 to 0.005 part of aminohydroxyphenazine.

It is of advantage to bleach in the absence of strong sunlight or artificial light, preferably in the dark.

The image silver is soon replaced by a violet intermediate stage which loses its density completely within 15 to 60 minutes.

If desired, intermediate rinses can be interposed at intervals of 3 to 5 minutes with water or aqueous alcohol or aqueous acetone each lasting for 1 to 5 minutes.

On completion of the bleaching out the film is rinsed for 5 to 15 minutes, whereupon any unconsumed image silver is converted into silver halide with the aid of one of the conventional silver bleach baths.

A suitable silver bleach bath is a solution containing in 1000 parts of water 50 to 100 parts of sodium chloride, 100 parts of crystalline copper sulfate and 25 to 70 parts of hydrochloric acid of 28% strength. The bleaching out takes 3 to 10 minutes. The film is then fixed in a solution of 200 parts of sodium thiosulfate in 1000 parts of water, and finally rinsed.

A positive blue print is obtained.

The process described above may constitute one stage of a multi-color process; in such a case there are present on one side of the support the red and yellow component images produced by any desired process, while on its other side there appears the blue image produced by the present process. The absorption maximum of the dye used for the present process, measured in water, is at 610 to 620 mµ and there is a high transparency at 400 to 550 mµ.

The blue image described can also be transferred to a new support, for example by a transfer process, to gelatinized paper or the like.

*Example 2*

A colorless cellulose film is first coated with a silver bromide gelatine layer dyed blue with copper phthalocyaninetetrasulfonic acid. Said gelatine layer contains silver bromide sensitized to the red spectral range in an amount of 12 to 20 mg. of silver and 4 to 8 mg. of dye per square decimeter to produce the desired color density of about 1.2 for pictures viewed in incident light, and of about 2 to 2.5 for pictures viewed in transmitted light. Said gelatine layer is advantageously topped with a colorless gelatine layer of 1 to 2 µ thickness, which contains a substance inhibiting diffusion, for example a biguanide.

The layer or layers described above is/are then coated with a silver bromide layer which is sensitized to the green spectral range and is dyed with a red azo dye that can be bleached out, then—if desired—with a yellow filter layer and finally with a blue sensitized silver bromide layer dyed with a yellow azo dye that can be bleached out.

This tripack is then exposed, either selectively under subtractive color positives or, for example, by additive exposure under a color transparency. The exposed tripack is then developed in a developer which contains per liter of water, for example, 0.75 gram of N-methyl-para-aminophenol, 3 grams of hydroquinone, 25 grams of sodium sulfite, 40 grams of sodium carbonate and 1 gram of potassium bromide. The developed film is rinsed for 1 to 2 minutes, fixed with sodium thiosulfate solution of 20% strength and again rinsed for 5 minutes. It is of advantage to harden the gelatine layers with a conventional potash alum bath. In each of the layers the image silver is obtained which is necessary for bleaching out the azo dyes and the copper phthalocyanine dye. The dye bleaching, conversion of the unconsumed image silver and fixing are carried out exactly as described in Example 1. A positive trichrome image is obtained having a very clear blue component image which is fast to light.

*Example 3*

Instead of the layer described in Example 2 containing copper phthalocyaninetetrasulfonic acid there is used as blue component layer a gelatine layer dyed with 3:3':3":3'''-copper phthalocyanine tetra-(sulfonic acid-3-methoxypropyl-amide).

To prepare the latter layer 3 to 6 grams of the dye are dissolved in 200 cc. of alcohol or acetone and the resulting solution is added to a molten gelatine solution containing about 10% of gelatine. A transparent blue gelatine is obtained which is allowed to solidify and cut up into strips, whereupon the organic solvent is washed out with water. This blue gelatine is melted and a photosensitive silver bromide-iodide emulsion, which may be sensitized to red, is added so that the cast, dried layer contains per square decimeter 3 to 3.2 mg. of silver and 4 to 8 mg. of dye, depending on whether the final image is to be viewed in incident or transmitted light.

The further treatment—that is to say exposure and development of the image silver—is carried out as described in Example 2. The dye bleach bath used is that described in Example 1 to which it is of advantage further to add per 1000 parts 100 to 250 parts of methanol, ethanol or propanol, or 250 parts of acetone or dioxane.

*Example 4*

When in Examples 1 to 3 the metal-free disulfonic, trisulfonic or tetrasulfonic acid of a phthalocyanine dye is used, very similar results are obtained because the metal-free phthalocyanine dye is converted in the silver bleach bath containing copper sulfate into its copper compound.

To overcome this, a silver bleach bath is used that contains in 1000 parts of water 60 parts of potassium ferricyanide, 15 parts of potassium bromide, 13 parts of secondary sodium phosphate and 6 parts of sodium sulfite.

The conversion of the metal-free phthalocyanine into the complex metal compound can then be cerried out at the end of the production of the image by treatment in a bath containing 2 to 3% of copper sulfate, nickel sulfate or manganese sulfate for 2 to 5 minutes. For the metallization there are suitable water-soluble compounds of the metals of atomic numbers 25 to 29, that is to say those of manganese, iron, cobalt, nickel or copper.

*Example 5*

The procedure described in Example 1 or 2 is followed, using the trisulfonic or tetrasulfonic acid of cobalt phthalocyanine.

In the course of the bleaching the dye is partially demetallized so that is is necessary to finish up with an after-treatment of the color image for 2 to 5 minutes with a solution of 15 to 30 grams of cobalt sulfate, cobalt nitrate or cobalt acetate to maintain the initial cyan color and the high fastness to light. Alternatively, said after-treatment can be carried out with manganese sulfate, nickel sulfate or copper sulfate or another water-soluble salt of these metals.

After-treatment with a cobalt salt produces an image of cyan color which displays an absorption maximum at 650 to 660 mμ and high transparency between 400 and 550 mμ (measured in water).

*Example 6*

A mixture 0.58 part of α-copper phthalocyanine (pigment), 0.3 part of a cold-wetting agent, for example a sodium alkylnaphthalenesulfonate, and 20 parts of water is ground in an efficient ball mill free from metal parts until substantially all dye particles have been reduced to a size below 0.5μ. The mixture is then flushed out of the mill with 50 parts of water and intimately mixed with 350 parts of a gelatine solution of 5.72% strength. The gelatine is of pure blue color and has a high transparency. 100 parts of this pigmented gelatine are mixed with 200 parts of a silver bromide emulsion (which may be sensitized to red) containing 3 to 6 parts of silver bromide. This mixture is cast on a suitable support, a film or on paper.

After exposure the layer is developed as described in Example 2, and the bleaching out of the dye and removal of the residual silver are carried out as described in Example 1.

*Example 7*

2 parts of the copper phthalocyanine dye of the formula

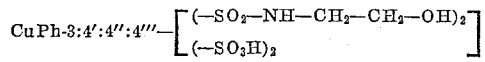

are dissolved in 50 parts of water, mixed with 6 parts of a saponine solution of 8% strength, and the mixture is added to 250 parts of a red-sensitized silver bromide gelatine emulsion containing 5 to 7 parts of silver bromide, and the whole is mixed.

Paper or a film is coated with this mixture in a manner such that after drying a coat about 5μ thick is obtained. This layer has at a wavelength of about 600 mμ an optical blue density of 1.3 logarithmic units. This layer can then be combined with a magenta silver bromide layer sensitized to yellow-green and with a silver bromide layer dyed yellow to form a tripack material.

Working up after exposure is carried out as follows:

(1) 12 minutes' development in a solution of 19° C. containing per liter 8.6 grams of N-methyl-para-aminophenol (as sulfate), 19 grams of sodium borate, 80 grams of sodium sulfite, 5 grams of anhydrous sodium carbonate and 0.5 gram of potassium bromide;

(2) 2 minutes' rinsing in water;

(3) 5 minutes' fixing in a solution containing per liter of water 220 grams of sodium thiosulfate and 20 grams of potassium meta-bisulfite;

(4) 3 minutes' rinsing in water;

(5) 10 minutes' hardening in a formaldehyde solution of 3.5% strength;

(6) 5 minutes' rinsing in water;

(7) 5 minutes' dye bleaching with a solution of 50 to 90 grams of potassium bromide, 30 to 50 grams of potassium bromide, 50 to 70 cc. of hydrochloric acid of 30% strength, 1 cc. of a solution of aminohydroxyphenazine of 0.1 to 0.2% strength;

(8) 3 minutes' rinsing in water;

(9) 2 minutes' bleaching in a potassium cyanide solution of 5% strength;

(10) 3 minutes' rinsing in water;

(11) 15 minutes' dye bleaching as under (7) above;

(12) 3 minutes' rinsing in water;

(13) dissolving out the residual silver with potassium cyanide solution of 5% strength for about 5 minutes;

(14) final rinse for 10 minutes, followed by drying.

The layer dyed with the phthalocyanine dye contains a blue image of good gradation, including pure white areas.

*Example 8*

When the dyestuff used in Example 7 is replaced by an optically equivalent amount of the dyestuff that contains a chlorine atom in each phenyl residue and corresponds to the formula

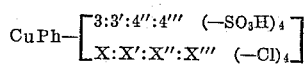

proceeding otherwise as described in Example 7, a cyan subtractive image is obtained.

*Example 9*

When the dye mentioned in Example 7 is replaced by an optically equivalent amount of the tetraphenyl-copper phthalocyanine containing 3 to 4 sulfonic acid groups, proceeding otherwise as described in Example 7, a cyan subtractive image is obtained.

In the following table there are listed several further copper phthalocyanines suitable as layer dyes for the silver dye bleach process, with which photographic layers and color images can be produced as described in Example 7. The shades obtained with these dyes are of blue, or in most cases cyan shades, whose absorption maximum lies between 600 and 670 mμ. The water-insoluble copper phthalocyanines are fast to diffusion and are advantageously applied in the form of a solution in a suitable organic solvent, for example ethylene glycol, which is added to the gelatine solution or silver halide emulsion which, after having been allowed to solidify and then converted by known methods into suitable shaped pieces, are washed out to remove the solvent (ethylene glycol) and the salts present.

| No. | Constitution | Solubility in water |
|---|---|---|
| 1 | CuPh-3:3′:3″:3‴—[(—SO$_2$—NH—CH$_2$—CH=CH$_2$)$_2$ / (—SO$_3$H)$_2$] | Soluble. |
| 2 | CuPh-3:3′:3″:3‴—[[—SO$_2$—NH—(CH$_2$)$_8$—CH$_3$]$_2$ / (—SO$_3$H)$_2$] | Insoluble. |
| 3 | CuPh-3:3′:3″:3‴—[[—SO$_2$—NH—(CH$_2$)$_3$—O—(CH$_2$)$_{11}$—CH$_3$]$_2$ / (—SO$_3$H)$_2$] | Do. |
| 4 | CuPh-3:3′:3″:3‴—[(—SO$_2$—NH—CH$_2$—CH=CH$_2$) / (—SO$_3$H)$_3$] | Soluble. |
| 5 | CuPh-3:3′:3″:3‴—[[—SO$_2$—NH—(CH$_2$)$_8$—CH$_3$] / (—SO$_3$H)$_4$] | Soluble in traces. |
| 6 | CuPh-3:3′:3″:3‴—[[—SO$_2$—NH—(CH$_2$)$_3$—O—(CH$_2$)$_{11}$—CH$_3$] / (—SO$_3$H)$_3$] | Do. |

| No. | Constitution | Solubility in water |
|---|---|---|
| 7 | CuPh-4:4':4'':4'''—$\begin{bmatrix} (-SO_2-NH-CH_2-CH_2-O-SO_2-OH)_2 \\ (-SO_3H)_2 \end{bmatrix}$ | Soluble. |
| 8 | CuPh-4:4':4'':4'''—$\begin{bmatrix} (-SO_2-NH-CH_2-CH_2-O-SO_2-OH)_3 \\ (-SO_3H) \end{bmatrix}$ | Do. |
| 9 | CuPh-4:4':4'':4'''—$\begin{bmatrix} (-SO_2-NH-CH_2-CH_2-OH) \\ (-SO_3H)_3 \end{bmatrix}$ | Do. |
| 10 | CuPh-4:4':4'':4'''—$\begin{bmatrix} (-SO_2-NH-CH_2-CH_2-OH)_2 \\ (-SO_3H)_2 \end{bmatrix}$ | Do. |
| 11 | CuPh-3:4':4'':4'''—$\begin{bmatrix} [-SO_2-NH-(CH_2)_4-OH] \\ (-SO_3H)_3 \end{bmatrix}$ | Do. |
| 12 | CuPh-3:4':4'':4'''—$\begin{bmatrix} [-SO_2-NH-(CH_2)_4-OH]_2 \\ (-SO_3H)_2 \end{bmatrix}$ | Do. |
| 13 | CuPh-4:4':4'':4'''—$\begin{bmatrix} [-SO_2-NH-(CH_2)_4-OH] \\ (-SO_3H)_3 \end{bmatrix}$ | Do. |
| 14 | CuPh-4:4':4'':4'''—$\begin{bmatrix} [-SO_2-NH-(CH_2)_4-OH]_2 \\ (-SO_3H)_2 \end{bmatrix}$ | Do. |
| 15 | CuPh-4:4':4'':4'''—$[-SO_2-NH-CH_2-CH_2-O-SO_2-OH]_4$ | Do. |
| 16 | CuPh-3:3':3'':3'''—$[-SO_2-NH-(CH_2)_3-\underset{CH_3}{N}-CH_2-CH_2-O-SO_2-OH]_4$ | Do. |
| 17 | CuPh-4:4':4'':4'''—$\begin{bmatrix} [-SO_2-N(-CH_2-CH_2-OH)_2] \\ (-SO_3H)_3 \end{bmatrix}$ | Do. |
| 18 | CuPh-4:4':4'':4'''—$\begin{bmatrix} [-SO_2-N(-CH_2-CH_2-OH)_2]_2 \\ (-SO_3H)_2 \end{bmatrix}$ | Do. |
| 19 | CuPh-3:3':3'':3'''—$[-SO_2-NH-CH_2-CH_2-N(C_2H_5)_2]_4$ | Insoluble. |
| 20 | CuPh-3:4':4'':4'''—$\begin{bmatrix} [-SO_2-NH-CH_2-CH_2-NH-C\text{(triazine with Cl and NH-phenyl-(SO_3H)_2)}]_2 \\ (-SO_3H)_2 \end{bmatrix}$ | Soluble. |
| 21 | CuPh-3:3':3'':3'''—$\begin{bmatrix} [-CH_2-NH-CO-\text{(phenyl-COOH)}]_2 \\ (-SO_3H)_2 \end{bmatrix}$ | Do. |

What is claimed is:

1. A photographic material suitable for the silver dyestuff bleaching process and containing on a support (a) a silver halide layer sensitized to the red spectral range and containing a blue to bluish green dyestuff, (b) a silver halide layer sensitized to the green range and containing a magenta dyestuff, and (c) a silver halide layer containing a yellow dyestuff, wherein the layer (a) is colored with a water-soluble phthalocyanine.

2. A photographic material suitable for the silver dyestuff bleaching process and containing on a support (a) a silver halide layer sensitized to the red spectral range and containing a blue to bluish green dyestuff, (b) a silver halide layer sensitized to the green range and containing a magenta dyestuff, and (c) a silver halide layer containing a yellow dyestuff, wherein the layer (a) is colored with a phthalocyanine selected from the group consisting of water-soluble manganese, cobalt, nickel and copper phthalocyanines.

3. A photographic material suitable for the silver dyestuff bleaching process and containing on a support (a) a silver halide layer sensitized to the red spectral range and containing a blue to bluish green dyestuff, (b) a silver halide layer sensitized to the green range and containing a magenta dyestuff, and (c) a silver halide layer containing a yellow dyestuff, wherein the layer (a) is colored with a water-soluble copper-phthalocyanine.

4. A photographic material suitable for the silver dyestuff bleaching process and containing on a support (a) a silver halide layer sensitized to the red spectral range and containing a blue to bluish green dyestuff, (b) a silver halide layer sensitized to the green range and containing a magenta dyestuff, and (c) a silver halide layer containing a yellow dyestuff, wherein the layer (a) is colored with a water-soluble copper-phthalocyanine containing at least one sulfonic acid group.

5. A photographic material suitable for the silver dyestuff bleaching process and containing on a support (a) a silver halide layer sensitized to the red spectral range and containing a blue to bluish green dyestuff, (b) a silver halide layer sensitized to the green range and containing a magenta dyestuff, and (c) a silver halide layer containing a yellow dyestuff, wherein the layer (a) is colored with a water-soluble copper-phthalocyanine containing at least one sulfonic acid group and at least one sulfonic acid amide group.

6. A photographic material suitable for the silver dyestuff bleaching process and containing on a support (a) a silver halide layer sensitized to the red spectral range and containing a blue to bluish green dyestuff, (b) a silver halide layer sensitized to the green range and conaining a magenta dyestuff, and (c) a silver halide layer containing a yellow dyestuff, wherein the layer (a) is colored with a water-soluble copper-phthalocyanine containing at least one sulfonic acid group and at least one sulfonic acid amide group substituted at the nitrogen atoms.

References Cited by the Examiner

UNITED STATES PATENTS

| | | | |
|---|---|---|---|
| 2,180,409 | 11/39 | Frankenburger et al. | 260—314.5 |
| 2,563,469 | 8/51 | Jennings | 96—73 |
| 2,600,377 | 6/52 | Chechak et al. | 260—314.5 |
| 2,629,658 | 2/53 | Sprung | 96—99 |
| 2,697,037 | 12/54 | Jelley et al. | 96—73 |

OTHER REFERENCES

Venkataraman: "Synthetic Dyes," vol. 2, Academic Press, 1952, pages 1134–1136.

NORMAN G. TORCHIN, *Primary Examiner.*

PHILIP E. MANGAN, *Examiner.*